(12) United States Patent
Khan et al.

(10) Patent No.: US 11,621,095 B2
(45) Date of Patent: Apr. 4, 2023

(54) METHOD FOR DEVELOPING RADIATION SHIELDING COMPOSITIONS

(71) Applicant: KING SAUD UNIVERSITY, Riyadh (SA)

(72) Inventors: Salah Ud-Din Khan, Riyadh (SA); Sajjad Haider, Riyadh (SA); Usma Ali Rana, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/003,034

(22) Filed: Jun. 7, 2018

(65) Prior Publication Data

US 2019/0378628 A1 Dec. 12, 2019

(51) Int. Cl.
G21F 1/10 (2006.01)
C08K 3/08 (2006.01)

(52) U.S. Cl.
CPC ............... *G21F 1/106* (2013.01); *C08K 3/08* (2013.01); *C08K 2003/0837* (2013.01); *C08K 2201/001* (2013.01)

(58) Field of Classification Search
CPC .................................. G21F 1/08; G21F 1/106
See application file for complete search history.

(56) References Cited

U.S. PATENT DOCUMENTS

| | | | |
|---|---|---|---|
| 2011/0040402 A1 | 2/2011 | Daniels | |
| 2014/0247924 A1* | 9/2014 | Lee | G21F 1/08 378/204 |
| 2015/0348660 A1* | 12/2015 | Cardon | G21F 1/106 252/478 |
| 2017/0200518 A1 | 7/2017 | Yang et al. | |

FOREIGN PATENT DOCUMENTS

| | | |
|---|---|---|
| CA | 2591994 A1 | 6/2006 |
| CN | 104132587 A | 11/2014 |
| CN | 105732880 A | 7/2016 |
| CN | 205722830 U | 11/2016 |

(Continued)

OTHER PUBLICATIONS

Mahdi et al. "Calculation and Study of Gamma ray Attenuation Coefficients for Different Compositions" Ibn Al-Haitham Journal for Pure and Applied Sciences, No. 3, vol. 25., 2012, pp. 133-141. (Year: 2012).*

(Continued)

*Primary Examiner* — Peter F Godenschwager
(74) *Attorney, Agent, or Firm* — Nath, Goldberg & Meyer; Richard C. Litman

(57) ABSTRACT

A computational method for development of radiation shielding compositions, as described herein, can include selecting at least one polymer and at least one metal for each of a plurality of radiation shielding compositions, selecting a polymer:metal ratio for each composition, performing computational analysis to calculate an attenuation coefficient associated with a given radiation dose for each composition, identifying a best candidate composition for radiation shielding based on the calculated attenuation coefficients, and preparing a radiation shielding material including the at least one polymer, the at least one metal, and the polymer metal ratio associated with the best candidate composition.

1 Claim, 17 Drawing Sheets

(56) References Cited

FOREIGN PATENT DOCUMENTS

| | | | |
|---|---|---|---|
| CN | 106750765 A | 5/2017 | |
| GB | 977456 A | * 12/1964 | ............. G21F 1/106 |
| GB | 1034533 A | 6/1966 | |

OTHER PUBLICATIONS

Narici et al., "Performances of Kevlar and Polyethylene as radiation shielding on-board the International Space Station in high latitude radiation environment," Scientific Reports, May 10, 2017; 7: 1644.

Ambika et al., "Role of bismuth oxide as a reinforcer on gamma shielding ability of unsaturated polyester based polymer composites," Journal of Applied Polymer Science, vol. 134, Issue 13, Apr. 5, 2017.

Li et al., "Effect of particle size on gamma radiation shielding property of gadolinium oxide dispersed epoxy resin matrix composite," Materials Research Express, vol. 4, No. 3, Mar. 23, 2017.

* cited by examiner

| | Composition (w/w) | | | | | |
|---|---|---|---|---|---|---|
| Elements | C | H | N | Pb | Gd | Bi |
| Weight Percentages | 67.91 | 5.7 | 26.4 | 2 | 2 | 2 |
| | | | | 4 | 4 | 4 |
| | | | | 6 | 6 | 6 |
| | | | | 8 | 8 | 8 |
| | | | | 10 | 10 | 10 |
| Combination-1 | ✓ | ✓ | ✓ | ✓ | x | x |
| Combination-2 | ✓ | ✓ | ✓ | x | ✓ | x |
| Combination-3 | ✓ | ✓ | ✓ | x | x | ✓ |

|  | Composition (w/w) | | | | |
|---|---|---|---|---|---|
| Elements | C | H | Pb | Gd | Bi |
| Weight Percentages | 32 | 68 | 2 | 2 | 2 |
|  |  |  | 4 | 4 | 4 |
|  |  |  | 6 | 6 | 6 |
|  |  |  | 8 | 8 | 8 |
|  |  |  | 10 | 10 | 10 |
| Combination-1 | ✓ | ✓ | ✓ | x | x |
| Combination-2 | ✓ | ✓ | x | ✓ | x |
| Combination-3 | ✓ | ✓ | x | x | ✓ |

Attenuation Coefficients (cm²/g)

| Photon Energy (MeV) | Polyethylene (with different percentages of Pb) | | | | | | | | | | Polyethylene (with different percentages of Gd) | | | | | | | | | | Polyethylene (with different percentages of Bi) | | | | | | | | | |
|---|---|---|---|---|---|---|---|---|---|---|---|---|---|---|---|---|---|---|---|---|---|---|---|---|---|---|---|---|---|---|
| | XCom | | | | | XuMuDat | | | | | XCom | | | | | XuMuDat | | | | | XCom | | | | | XuMuDat | | | | |
| Simulation Code / Percentage Composition | 2 | 4 | 6 | 8 | 10 | 2 | 4 | 6 | 8 | 10 | 2 | 4 | 6 | 8 | 10 | 2 | 4 | 6 | 8 | 10 | 2 | 4 | 6 | 8 | 10 | 2 | 4 | 6 | 8 | 10 |
| 3000 | 0.0 5074 | 0.0 504 | 0.0 4973 | 0.0 494 | 0.0 4872 | 0.0 5055 | 0.0 5021 | 0.0 4954 | 0.0 4921 | 0.0 4854 | 0.0 4982 | 0.0 493 | 0.0 4884 | 0.0 4792 | 0.0 4706 | 0.0 4963 | 0.0 4911 | 0.0 4826 | 0.0 477 4 | 0.0 4689 | 0.0 5085 | 0.0 5054 | 0.0 4989 | 0.0 4958 | 0.0 4893 | 0.0 5066 | 0.0 5035 | 0.0 4971 | 0.0 4940 | 0.0 4875 |
| 5000 | 0.0 4036 | 0.0 4067 | 0.0 4075 | 0.0 4106 | 0.0 4114 | 0.0 4017 | 0.0 4048 | 0.0 4057 | 0.0 4088 | 0.0 4097 | 0.0 4047 | 0.0 4081 | 0.0 4091 | 0.0 4124 | 0.0 4135 | 0.0 3991 | 0.0 392 | 0.0 3908 | 0.0 3918 | 0.0 3905 | 0.0 4028 | 0.0 4062 | 0.0 4073 | 0.0 4107 | 0.0 4118 | 0.0 4047 | 0.0 4028 | 0.0 4075 | 0.0 4066 | 0.0 4118 |
| 10000 | 0.0 3232 | 0.0 3355 | 0.0 3467 | 0.0 3529 | 0.0 3704 | 0.0 3223 | 0.0 3348 | 0.0 346 | 0.0 3584 | 0.0 3732 | 0.0 3271 | 0.0 3371 | 0.0 3486 | 0.0 3613 | 0.0 3439 | 0.0 3076 | 0.0 3172 | 0.0 3254 | 0.0 3357 | 0.0 3432 | 0.0 3236 | 0.0 3364 | 0.0 3478 | 0.0 3606 | 0.0 3754 | 0.0 3217 | 0.0 3378 | 0.0 3493 | 0.0 3606 | 0.0 3721 |
| 15000 | 0.0 3025 | 0.0 3206 | 0.0 3378 | 0.0 356 | 0.0 3732 | 0.0 3016 | 0.0 3175 | 0.0 339 | 0.0 3551 | 0.0 3724 | 0.0 2991 | 0.0 3225 | 0.0 3128 | 0.0 3274 | 0.0 3411 | 0.0 2846 | 0.0 2837 | 0.0 313 | 0.0 3265 | 0.0 3402 | 0.0 3033 | 0.0 3225 | 0.0 3423 | 0.0 3585 | 0.0 3854 | 0.0 3023 | 0.0 3217 | 0.0 3378 | 0.0 3578 | 0.0 3721 |
| 20000 | 0.0 2964 | 0.0 3184 | 0.0 3398 | 0.0 3551 | 0.0 3832 | 0.0 2955 | 0.0 3175 | 0.0 347 | 0.0 366 1 | 0.0 3824 | 0.0 2938 | 0.0 3138 | 0.0 3111 | 0.0 3290 | 0.0 3436 | 0.0 2750 | 0.0 2929 | 0.0 3102 | 0.0 3285 | 0.0 3402 | 0.0 2982 | 0.0 3225 | 0.0 3411 | 0.0 3585 | 0.0 3856 | 0.0 2955 | 0.0 3217 | 0.0 3414 | 0.0 3606 | 0.0 3856 |
| 25000 | 0.0 2958 | 0.0 3242 | 0.0 3511 | 0.0 3783 | 0.0 4052 | 0.0 296 | 0.0 3231 | 0.0 3452 | 0.0 3706 | 0.0 3956 | 0.0 2938 | 0.0 3143 | 0.0 3173 | 0.0 3351 | 0.0 3536 | 0.0 2719 | 0.0 2928 | 0.0 3132 | 0.0 3381 | 0.0 3545 | 0.0 2978 | 0.0 329 | 0.0 349 | 0.0 3748 | 0.0 4078 | 0.0 2968 | 0.0 3226 | 0.0 348 | 0.0 3805 | 0.0 4078 |
| 30000 | 0.0 297 | 0.0 3242 | 0.0 3534 | 0.0 3841 | 0.0 4246 | 0.0 296 | 0.0 3231 | 0.0 350 | 0.0 3772 | 0.0 4041 | 0.0 2952 | 0.0 3260 | 0.0 3397 | 0.0 3514 | 0.0 3618 | 0.0 2749 | 0.0 2742 | 0.0 3163 | 0.0 3507 | 0.0 3766 | 0.0 2981 | 0.0 3265 | 0.0 3560 | 0.0 3817 | 0.0 4281 | 0.0 2968 | 0.0 3256 | 0.0 3530 | 0.0 3871 | 0.0 4281 |
| 40000 | 0.0 3022 | 0.0 3342 | 0.0 3634 | 0.0 3941 | 0.0 4246 | 0.0 2958 | 0.0 3306 | 0.0 3627 | 0.0 3936 | 0.0 4241 | 0.0 3008 | 0.0 3267 | 0.0 3665 | 0.0 3976 | 0.0 4286 | 0.0 2755 | 0.0 2865 | 0.0 3660 | 0.0 3508 | 0.0 3893 | 0.0 3039 | 0.0 3250 | 0.0 3560 | 0.0 3805 | 0.0 4281 | 0.0 2981 | 0.0 3256 | 0.0 3560 | 0.0 3871 | 0.0 4281 |
| 50000 | 0.0 3181 | 0.0 3329 | 0.0 3744 | 0.0 4076 | 0.0 4407 | 0.0 3075 | 0.0 3306 | 0.0 3738 | 0.0 4107 | 0.0 4402 | 0.0 3069 | 0.0 3297 | 0.0 3744 | 0.0 4114 | 0.0 4445 | 0.0 2895 | 0.0 2865 | 0.0 3344 | 0.0 3618 | 0.0 3893 | 0.0 3099 | 0.0 3435 | 0.0 3777 | 0.0 4114 | 0.0 4445 | 0.0 3099 | 0.0 3435 | 0.0 3772 | 0.0 4108 | 0.0 4445 |

|  | Composition | | | | | |
| --- | --- | --- | --- | --- | --- | --- |
| Elements | C | H | N | Pb | Gd | Bi |
| Weight Percentages | 40 | 32 | 28 | 2 | 2 | 2 |
|  |  |  |  | 4 | 4 | 4 |
|  |  |  |  | 6 | 6 | 6 |
|  |  |  |  | 8 | 8 | 8 |
|  |  |  |  | 10 | 10 | 10 |
| Combination-1 |  | ✓ | ✓ | ✓ | x | x |
| Combination-2 |  | ✓ | ✓ | x | ✓ | x |
| Combination-3 |  | ✓ | ✓ | x | x | ✓ |

Attenuation Coefficients (cm²/g)

| Photon Energy (MeV) | Kevlar (with different percentages of Pb) | | | | | | | | | Kevlar (with different percentages of Gd) | | | | | | | | | Kevlar (with different percentages of Bi) | | | | | | | | |
|---|---|---|---|---|---|---|---|---|---|---|---|---|---|---|---|---|---|---|---|---|---|---|---|---|---|---|---|
| Simulation Code | XCom | | | | XuMuDat | | | | | XCom | | | | XuMuDat | | | | | XCom | | | | XuMuDat | | | | |
| Percentage Composition | 2 | 4 | 6 | 8 | 10 | 2 | 4 | 6 | 8 | 10 | 2 | 4 | 6 | 8 | 10 | 2 | 4 | 6 | 8 | 10 | 2 | 4 | 6 | 8 | 10 | | |

METHOD FOR DEVELOPING RADIATION SHIELDING COMPOSITIONS

BACKGROUND

1. Field

The disclosure of the present patent application relates to computational development of materials for radiation shielding applications, and particularly to computational development of compositions including at least one polymeric compound and at least one metal for radiation shielding applications.

2. Description of the Related Art

Use of algorithms and computational programs for developing products associated with different industrial applications can be an effective alternative to actual experimentation. Such computational methods of testing and development can help conserve resources, time, and cost. Many different analyses, such as synthesis analysis, dose effect analysis, and radiation analysis can be performed with the help of an appropriate computer program.

Lead is generally used for radiation blocking purposes and employed in hospitals, research centers, and industrial units. Lead atoms are tightly packed, facilitating maximum interaction of an ionizing photon with the atoms. Lead is also cheap, abundant, and easily formable into bricks or sheets. Excessive use of lead can be undesirable, however, as lead has a relatively high density (11.35 g/cm$^3$), and can be toxic and difficult to dispose. Experimental procedures for testing other materials which can provide optimal radiation-shielding can be time-consuming and costly.

Accordingly, it is desirable to use computational methods to develop suitable compositions for nuclear shield applications, thereby avoiding or minimizing experimental procedures.

SUMMARY

A computational method for development of radiation shielding compositions, as described herein, can include selecting at least one polymer and at least one metal for each of a plurality of radiation shielding compositions, selecting a polymer:metal ratio for each of the compositions, performing computational analysis to calculate an attenuation coefficient for each composition, identifying a best candidate composition for radiation shielding based on the calculated attenuation coefficients, and preparing a radiation shielding material having including the at least one polymer, the at least one metal, and the polymer metal ratio associated with the best candidate composition.

The present methods can be useful to assess and identify suitable radiation shielding compositions prior to experimentation, thus, reducing the cost of experimentation and supplies used during testing. Radiation-shielding materials can be used in radiology departments of hospitals, research centers, any other facility in which harmful radiation needs to be blocked.

These and other features of the present disclosure will become readily apparent upon further review of the following specification and drawings.

BRIEF DESCRIPTION OF THE DRAWINGS

FIG. 3 is a table of the various compositions including PAN (polyacrylonitrile) and either lead, gadolinium, or bismuth.

FIG. 4 is a table listing attenuation coefficients exhibited by the various compositions including PAN and lead, gadolinium, or bismuth, under photon energy ranging from 3,000-50,000 MeV.

FIG. 6 is a table listing the various of the compositions including polyethylene and various amounts of lead, gadolinium, or bismuth.

FIG. 7 is a table listing attenuation coefficients exhibited by the compositions including polyethylene and different lead, gadolinium, or bismuth, under photon energy ranging from 3,000-50,000 MeV.

FIG. 9 is a table listing the various compositions including Kevlar® aramid fiber (polyparaphenylene terephthalamide) and lead, gadolinium, or bismuth.

FIG. 10 is a table listing attenuation coefficients exhibited by the compositions including Kevlar® aramid fiber and lead, gadolinium, or bismuth, under photon energy ranging from 3,000-50,000 MeV.

DETAILED DESCRIPTION OF THE PREFERRED EMBODIMENTS

Figure 1:
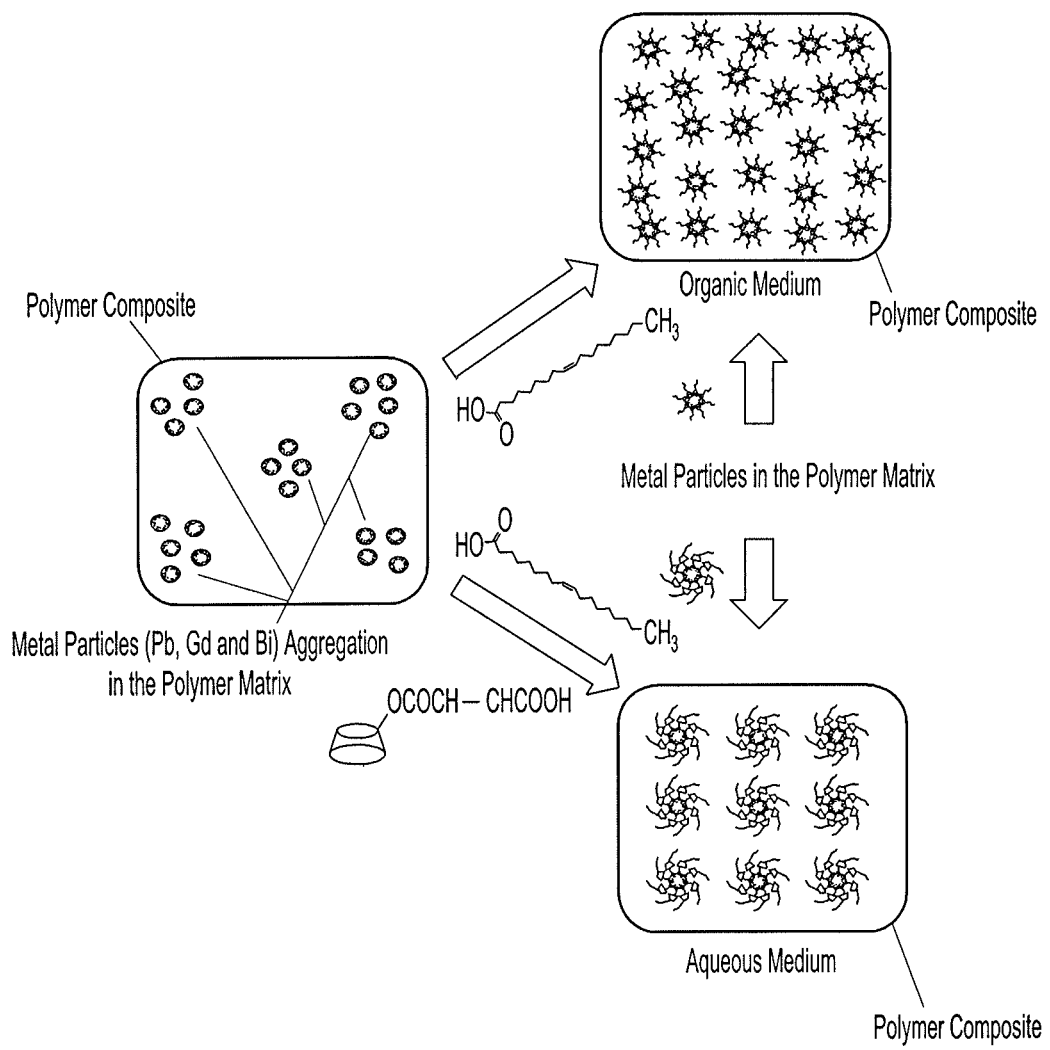
FIG. 1 is a schematic diagram for the dispersion of metal particles in the polymer matrix.

A computational method for development of radiation shielding compositions, as described herein, can be used to achieve radiation shielding materials that are lightweight, flexible, and non-toxic, without experimental procedures. For example, the present computational methods can be used to calculate attenuation coefficients under different radiation doses for a plurality of candidate or theoretical radiation shielding compositions for radiation shielding applications. Each candidate composition can include at least one polymer and at least one metal.

The method can include selecting at least one polymer and at least one metal for each of a plurality of candidate radiation shielding compositions, selecting a polymer:metal ratio for each composition, performing computational analysis to calculate an attenuation coefficient associated with a given radiation dose for each composition, identifying a best candidate composition for radiation shielding based on the calculated attenuation coefficients, and preparing a radiation shielding material including the at least one polymer, the at least one metal, and the polymer metal ratio associated with the best candidate composition.

Ideal metal materials for nuclear shield applications have lower density and higher neutron capture cross-section. One such material is gadolinium, which is a naturally occurring material and commonly used as a neutron absorber in the nuclear industry. Among all isotopes of gadolinium, two isotopes, namely Gd155 and Gd157, are stable and have higher absorption cross-section. Similarly, bismuth is non-toxic in nature and can be mixed with borate glass to provide lead-free shielding materials with low melting point.

There are other higher atomic number elements that can be used for radiation shielding purposes, but they are very rare, expensive, toxic, and/or already radioactive (Au: 19.32 g/cm$^3$; Pt: 21.45 g/cm$^3$; Hg: 13.55 g/cm$^3$; U: 18.95 g/cm$^3$).

The present innovative method was used to computationally identify suitable mixtures for radiation shielding materials. For the computational testing described herein, XCOM and XuMuDat programs were used because of their capability for evaluating radiation shielding. It should be understood, however, that other appropriate programs can be used. One of three polymeric compounds were computationally mixed with of one of three metals in various proportions to achieve theoretical radiation-shielding compositions. In particular, each candidate composition included one metal selected from the group consisting of lead, gadolinium, and bismuth and one polymeric compound selected from the group consisting of PAN (Polyacrylonitrile), Polyethylene, and Kevlar® aramid fiber (polyparaphenylene terephthalamide). Computational analysis identified the mixtures having the maximum attenuation coefficients under a given radiation dose—which experimentally may not be possible. The candidate compositions were computationally irradiated with a photon energy source (300-5000 MeV) to determine the attenuation coefficient or radiation shielding capability of each composition. It is well understood that those materials with the highest attenuation coefficients when exposed to photon energies can be the most efficient radiation shielding materials.

All of the compositions computationally subjected to photon energy of 300-5000 MeV, demonstrated good attenuation coefficients. The compositions including lead, especially at higher concentrations, attained the highest attenuation coefficients than the compositions including gadolinium and the compositions including bismuth. Even so, the compositions including gadolinium and the compositions including bismuth still produced very good attenuation coefficients. As such, the compositions including gadolinium and the compositions including bismuth can be more ideal for radiation-shielding applications, as these compositions also have lower weight and decreased toxicity than compositions including lead. The results obtained using the XCOM program were verified and validated by comparison with the results using the XuMuDat program to confirm the accuracy of the simulation results. The computational methods described herein open new grounds for developing radiation-shielding materials more efficiently and more economically than by experimental laboratory techniques.

The present teachings are illustrated by the following examples.

Example 1: Computational Techniques

Research was performed theoretically in order to calculate and forecast attenuation coefficients of various polymer mixtures. For this purpose, the present theoretical-computational approach used XCOM and XuMuDat programs. Simulations were performed considering the following input parameters:
1. Geometry of gamma source and detector used;
2. Distance between source, detector and sample;
3. Intensity of gamma rays and detection capability; and
4. Elemental analysis.

The attenuation coefficients were computationally calculated for each of the candidate compositions including one polymeric compound and one metal in different proportions, using both the XCOM and XuMuDat programs. One advantage of such computational techniques is the ease and efficiency of simulating a variety of different shielding materials, and their capabilities against different gamma/neutron sources with a variety of intensities. There is also an option for point detectors used for the calculations. The details of the computational programs are as follows:

XCOM

Berger and Hubbell developed and designed the XCOM computational program to calculate cross sections and attenuation coefficients for any compound, element, or mixture. This program can calculate attenuation coefficients ranging from 1.0 GeV to 100.0 GeV. The program is available in an internet version.

The XCOM program can be used to generate cross sections and attenuation coefficients as a logarithmically-spaced approximation, spaced approximation, and standard energy grid on a selected grid. Inherent scattering, coherent scattering, photoelectric absorption, and pair production all may be calculated using this program. XCOM provides an interface to facilitate the defining and redefining of substances or mixtures, from the list of elements (1<Z<100).

XuMuDat

The XuMuDat program is used to calculate various photon interaction coefficients. The program has the capability to consider six elements at one time. The photon energy range of this program is 1 KeV to 50 MeV, for calculation of the mass attenuation coefficient, mass energy absorption, and mass energy transfer coefficient. Each compound to be tested may contain elements having atomic numbers ranging from a to 92.

Example 2: Research Methodology

Three polymeric compounds were mixed with different percentages of each of the following metals, one at a time:lead, gadolinium, or bismuth, for assessing the accuracy of compound combinations and validation studies. The combinations of polymer and metal in the compositions can be as follows:
Polyacrylonitrile (PAN) mixed with lead, gadolinium, or bismuth;
Polyethylene mixed with lead, gadolinium, or bismuth; or
Kevlar® aramid fiber mixed with lead, gadolinium or bismuth.

For purposes of the computational analyses, homogenous dispersion of the metal particles in the polymer matrix was assumed. It was noted, however, that metal particles can aggregate when incorporated in a polymer matrix. Aggregation results in the loss of synergic effect and efficacy of the particles and polymer in the composition. The loss of synergy can result in decreased performance of the composite. To overcome this issue in practice, the metal particles can be functionalized to obtain well-dispersed particles in the polymer matrix. This enables avoidance of aggregation, and use of the particles and polymer to their full potential. Using strategies known in the art, metal particles can also be dispersed in aqueous medium.

FIG. 1 depicts a schematic diagram demonstrating the dispersion of metal particles in the polymer matrix using organic medium compared to aqueous medium.

The basic formula for an attenuation coefficient is given as $$I=I_0 e^{-\mu t}$$

where $I_0$=incident intensity; $\mu$=attenuation coefficient; $t$=thickness; and $I$=intensity through the sample. Also, for the mass attenuation coefficients, the following formulas are applicable:

$$\mu_a = \frac{\mu}{\rho}$$

$$I = I_0 e^{-(\mu/\rho)\rho_i}$$

As required by the theoretical calculations of the mixture of elements under variable weight percentages, the total mass attenuation coefficients can be identified pursuant to equation (1):

$$\mu_{mix} = \sum_{i=n} w_i (\mu_{mix})_i \quad (1)$$

where $w_i$ is the weight fraction of the mixture of elements. The total atomic cross section can then be calculated using equation (2):

$$\sigma_{total} = \frac{\mu_{mix}}{N_A} \sum_{i=n} n_i A_i \quad (2)$$

The mean free path length ($\lambda$) for the photon energy to successive interaction is provided using equation (3):

$$\lambda = \frac{\int_0^\infty x \exp(-\mu x) dx}{\int_0^\infty x \exp(-\mu x) dx} = \frac{1}{\mu_1} \quad (3)$$

Equations (1) to (3) in combination are useful for calculating absorption and attenuation of photon radiation, depending entirely on the effective atomic number of the element or mixture.

Example 3: Design of Computational "Facility" for Radiation Shielding

Figure 2:
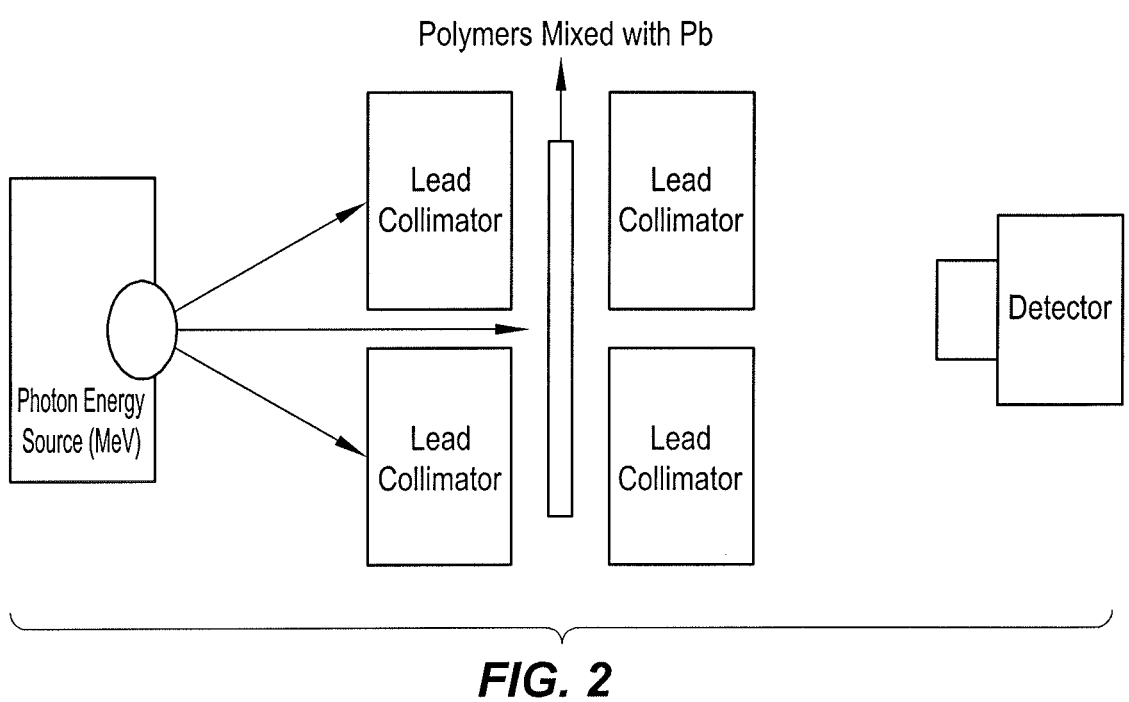
FIG. 2 is a schematic diagram for the computational determination of the attenuation coefficient.

Different percentages of lead, gadolinium, or bismuth were mixed computationally with a polymeric compound to check the relative capabilities for shielding against radiation effects. The combinations of the metals, in a range of weight percentages for each polymer, were examined and simulated by both XCOM and XuMuDat programs. The schematic diagram of the computational setup is illustrated in FIG. 2.

Photon energy was designated as the computational radiation source for the various compositions including a polymer and lead, bismuth or gadolinium. The programs were used to computationally "measure" the linear and mass attenuation coefficients of each composition.

As it is very important to verify and validate theoretical or computational results, both XCOM and XuMudat programs were used in the study to enable comparison analysis, to design and validate the results. Both programs generally produced the same results, further confirming the consistency and accuracy of computational simulation calculations, and helping to provide validation of the concept.

Example 4: Polyacrylonitrile (PAN) Mixed with Lead, Gadolinium, or Bismuth

The above-mentioned computational techniques were used to calculate the attenuation coefficients of compositions including PAN and different percentages of lead, gadolinium, or bismuth (e.g., 2%, 4%, 6%, 8%, and 10% of each of the metals). The various combinations are reflected in the table shown in FIG. 3.

Figure 4:
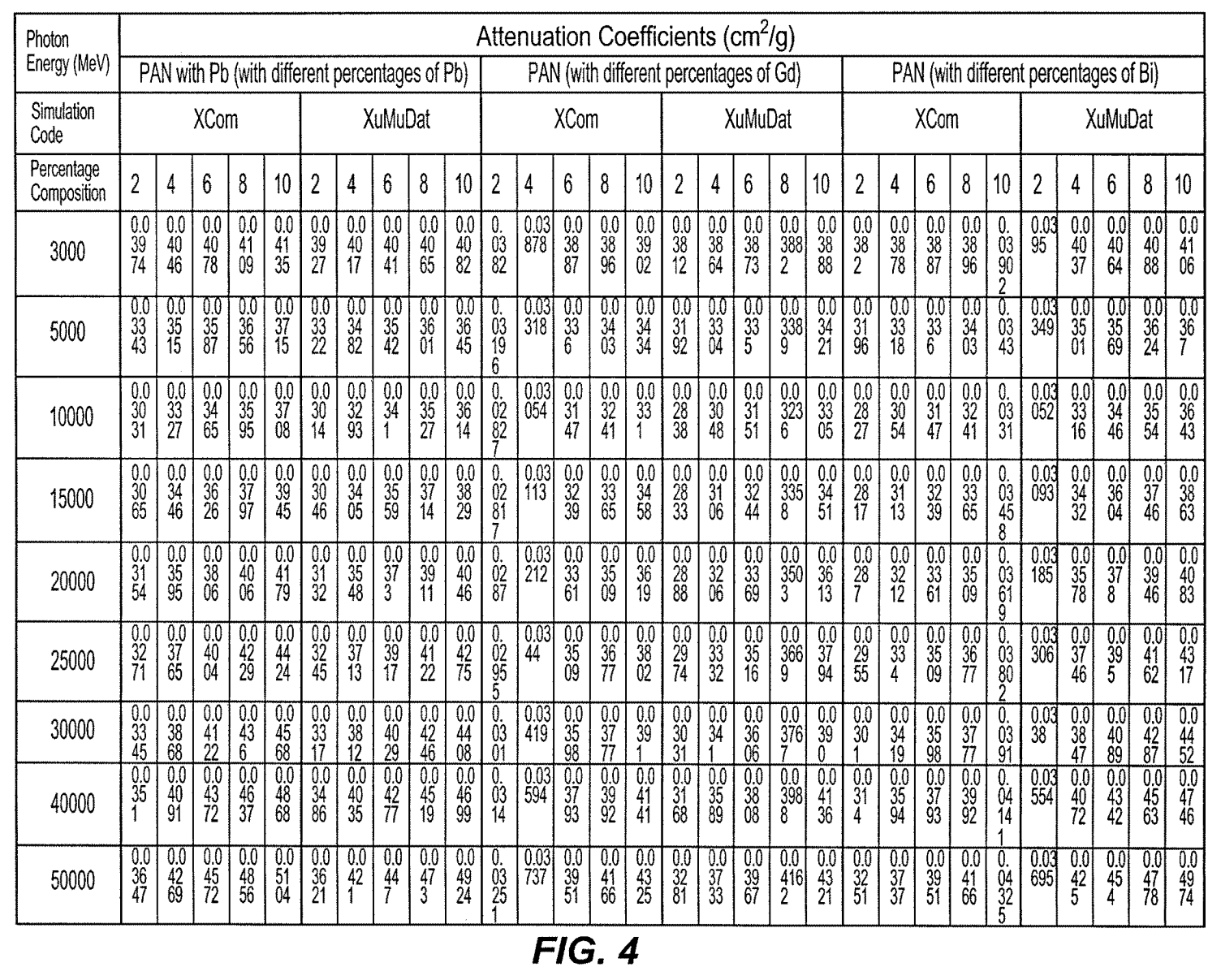
Figure 5A:
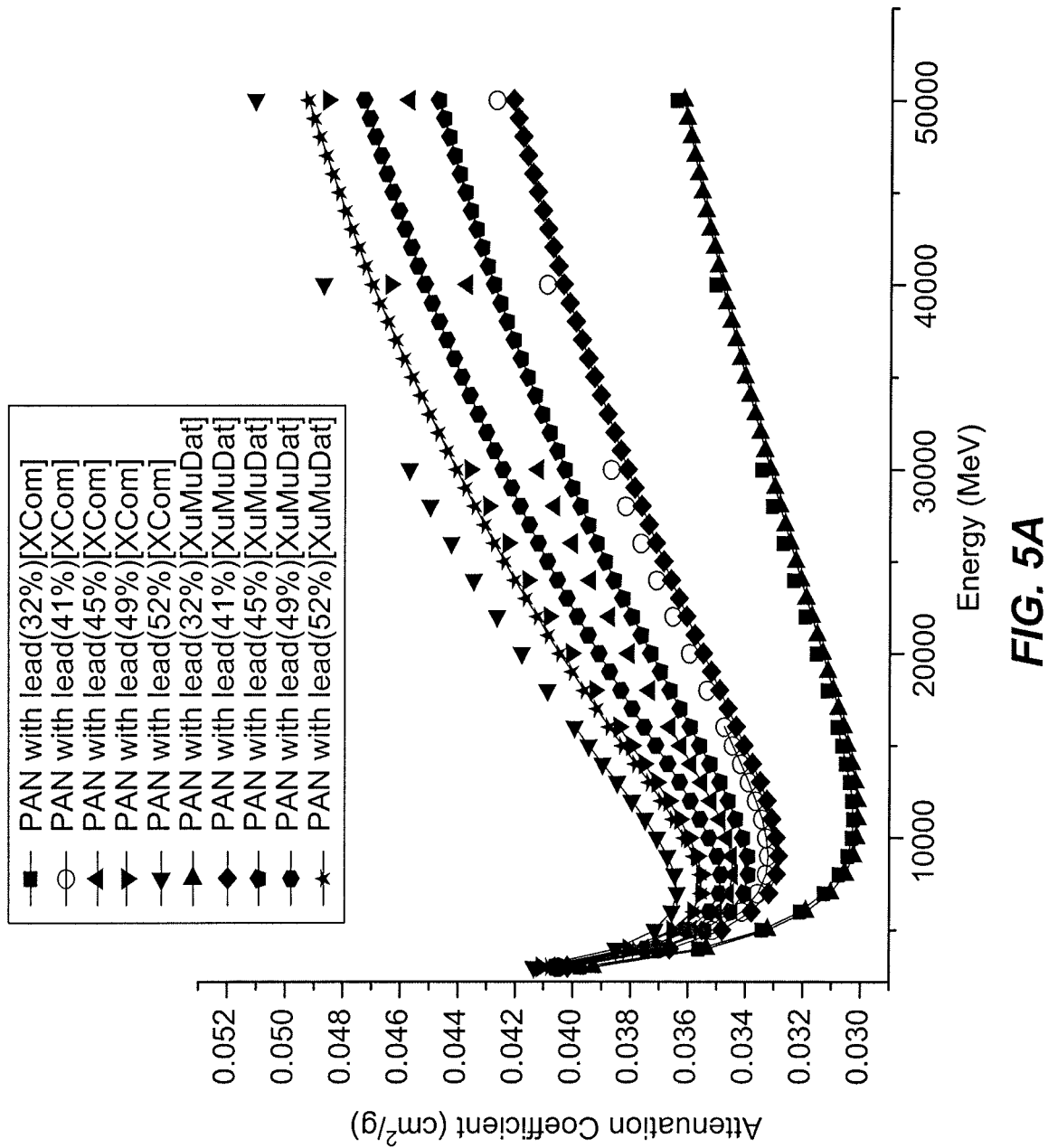
FIG. 5A is a graph representing the attenuation coefficient for the compositions including PAN and various amounts of lead, using both XCOM and XuMuDat analyses.
Figure 5B:
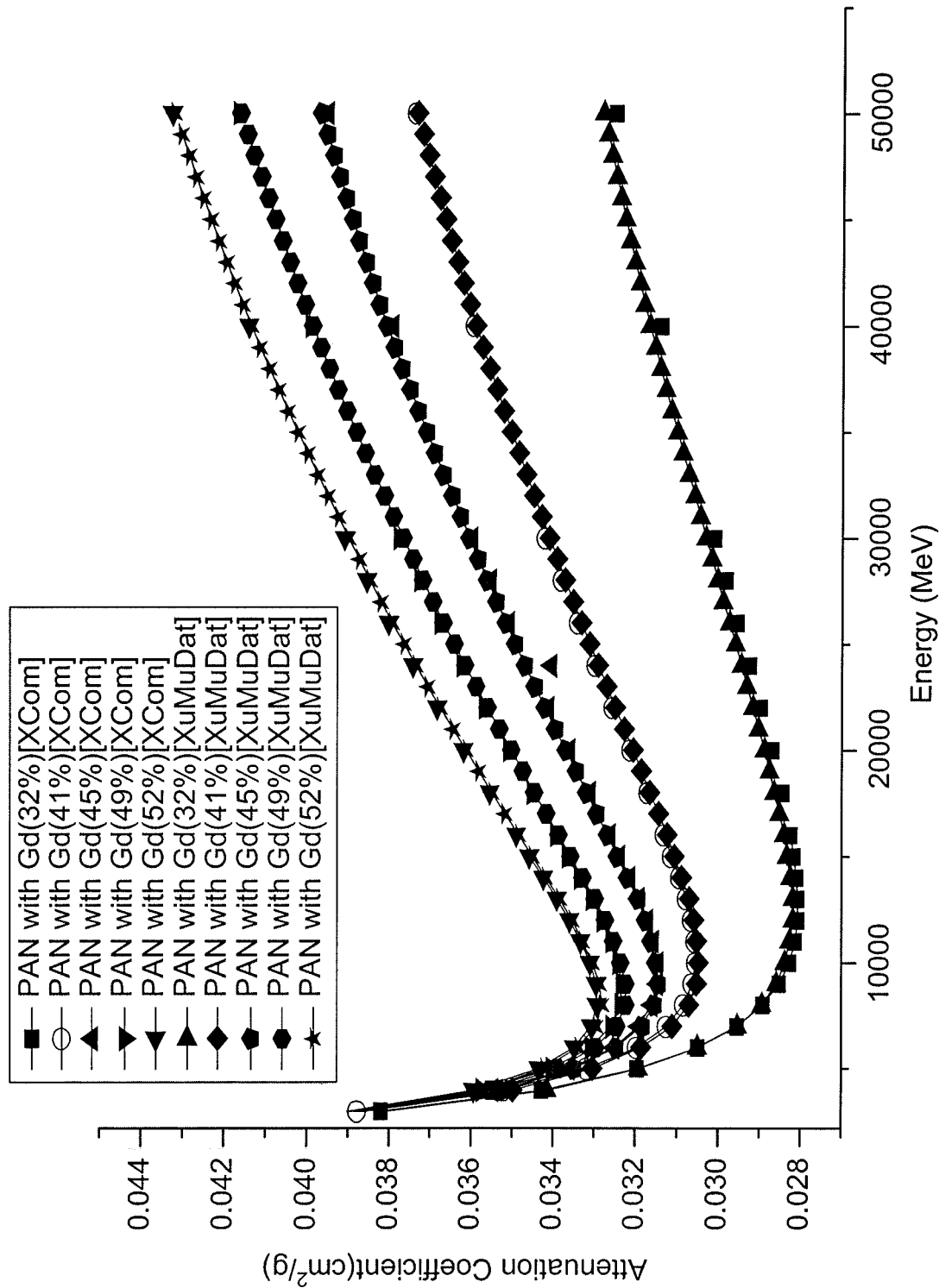
FIG. 5B is a graph representing the attenuation coefficient for the compositions including PAN and various amounts of gadolinium, using both XCOM and XuMuDat analyses.
Figure 5C:
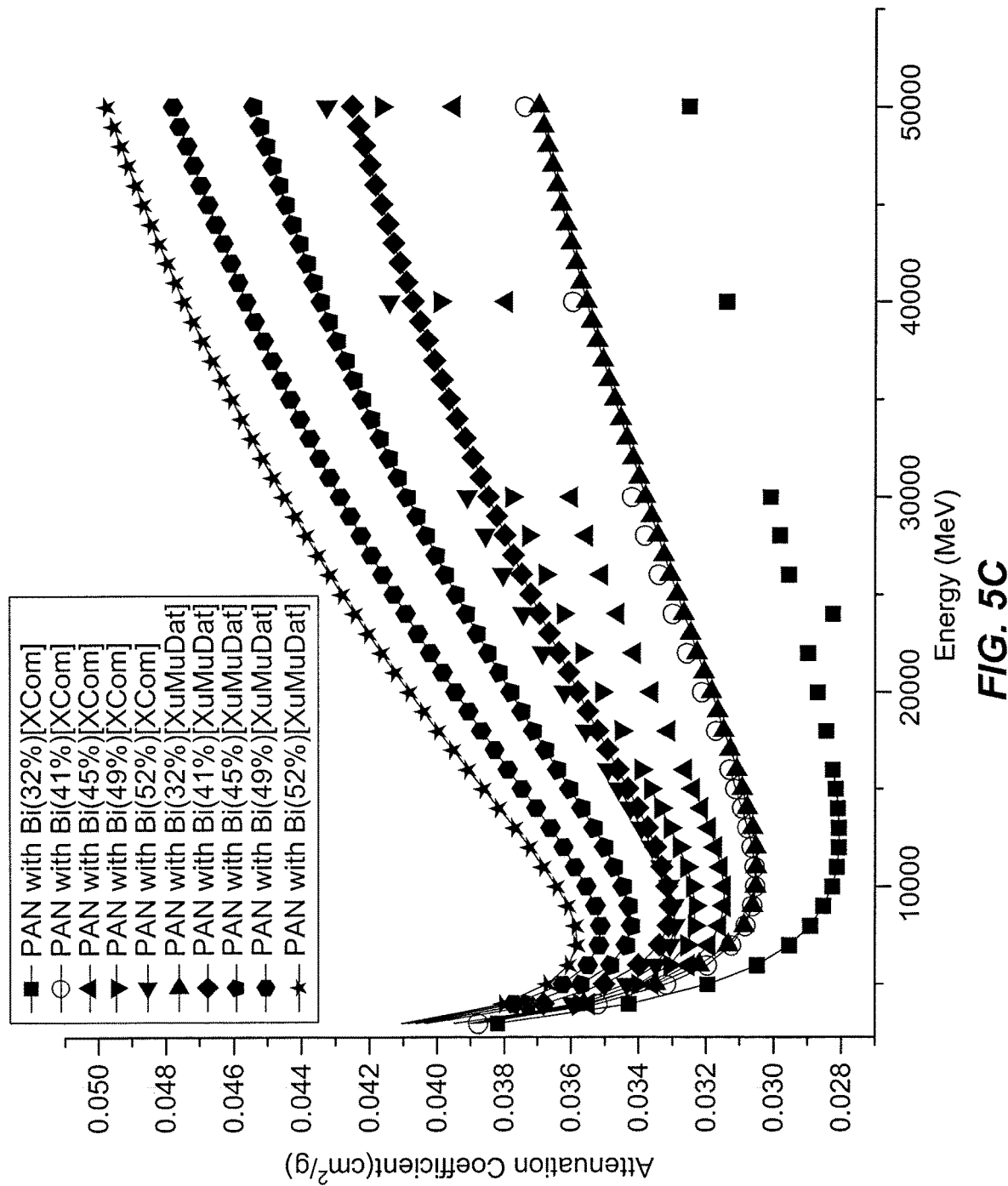
FIG. 5C is a graph representing the attenuation coefficient for the compositions including PAN and various amounts of bismuth, using both XCOM and XuMuDat analyses.

The results for both XCOM and XuMuDat testing are shown in FIG. 4, and reflected in FIGS. 5A to 5C. FIG. 4 is a chart listing the attenuation coefficients for the varius compositions including PAN and a metal at various proportions, for each of the tested energy levels: 3000, 5000, 10,000, 15,000, 20,000, 25,000, 30,000, 40,000, and 50,000 MeV. FIGS. 5A to 5C are graphs plotting the attenuation coefficient for the range of energy from 3000 MeV to 50,000 MeV, for the compositions including PAN and the various proportions of lead (FIG. 5A), gadolinium (FIG. 5B), and bismuth (FIG. 5C).

The results demonstrate that PAN, with maximum percentages of lead, attains the highest attenuation coefficients, with both the XCOM and XuMuDat programs. PAN, with the gadolinium or bismuth, produced slightly lower attenuation coefficients, confirming that relatively, as may be expected, lead has the maximum ability to attenuate the photon energy source.

The variation in Z with photon energy can be examined to reflect different mechanisms of the photoelectric effect, and coherent and incoherent scattering. At slightly lower energies, photoelectric effect dominates and thus increases the effective value of Z. At higher energies, scattering dominates, thus limiting the values of Z. Thus, the values of Z for total gamma ray interaction starts from higher energy levels to lower energy levels, depending on the relative dependency of partial gamma ray interaction in the process. This effective atomic number increases with increased proportions of the lead, bismuth or gadolinium ratio. See FIGS. 5A, 5B, and 5C.

Example 5: Polyethylene Mixed with Lead, Gadolinium and Bismuth

Different percentages of lead, gadolinium, or bismuth were mixed with polyethylene under the variable weight percentages, as shown in the table depicted in FIG. 6. The XCOM and XuMuDat programs were used to calculate attenuation coefficients of these compositions, using the same procedure and same variety of proportions of lead, gadolinium, or bismuth discussed above. The same proportion of Pb, Gd and Bi were used for each combination with polyethylene, again for calculating which combination would have the best attenuation results.

Figure 8A:
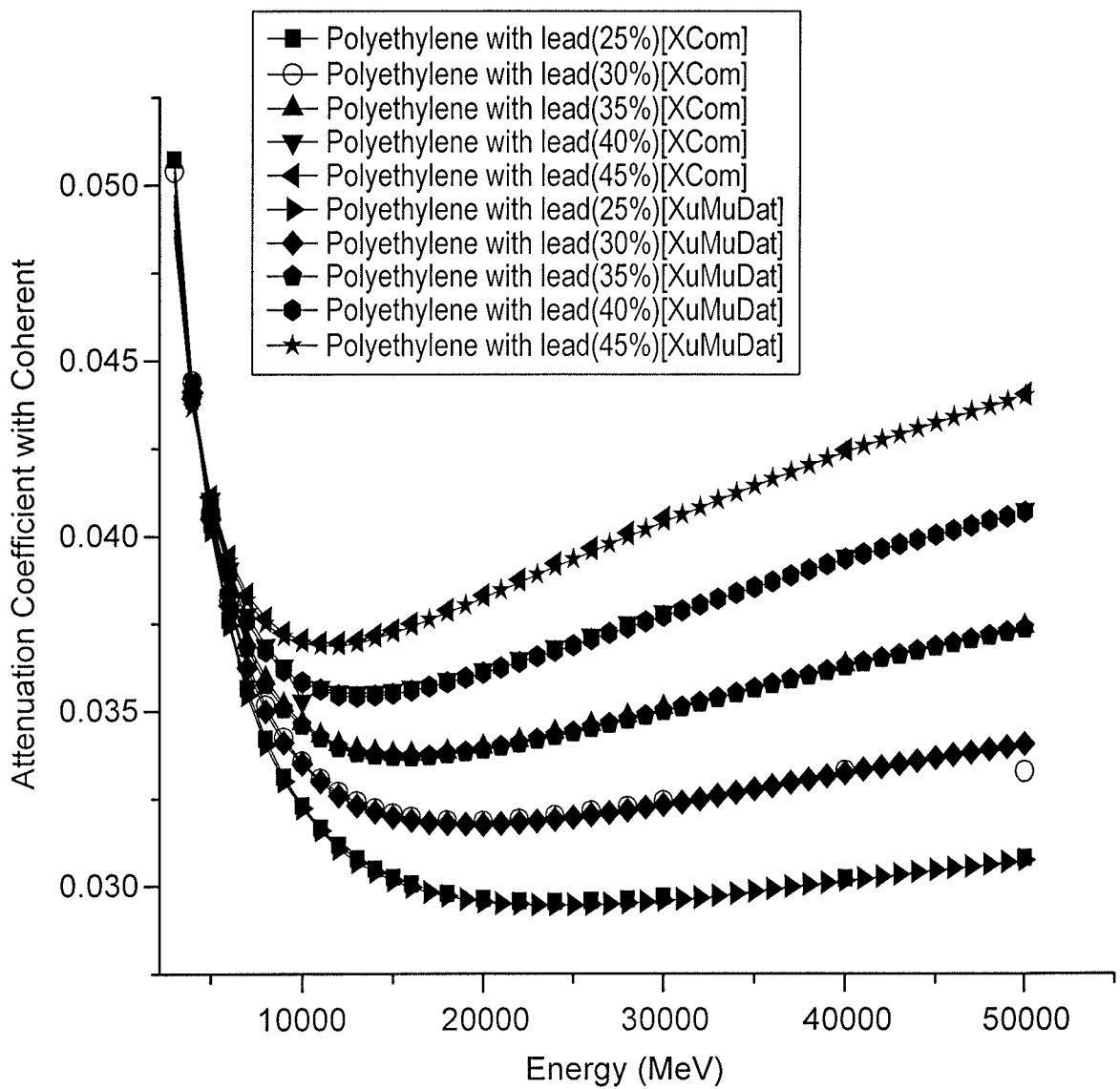
FIG. 8A is a graph representing the attenuation coefficient for the compositions including polyethylene and various amounts of lead, using both XCOM and XuMuDat analyses.
Figure 8B:
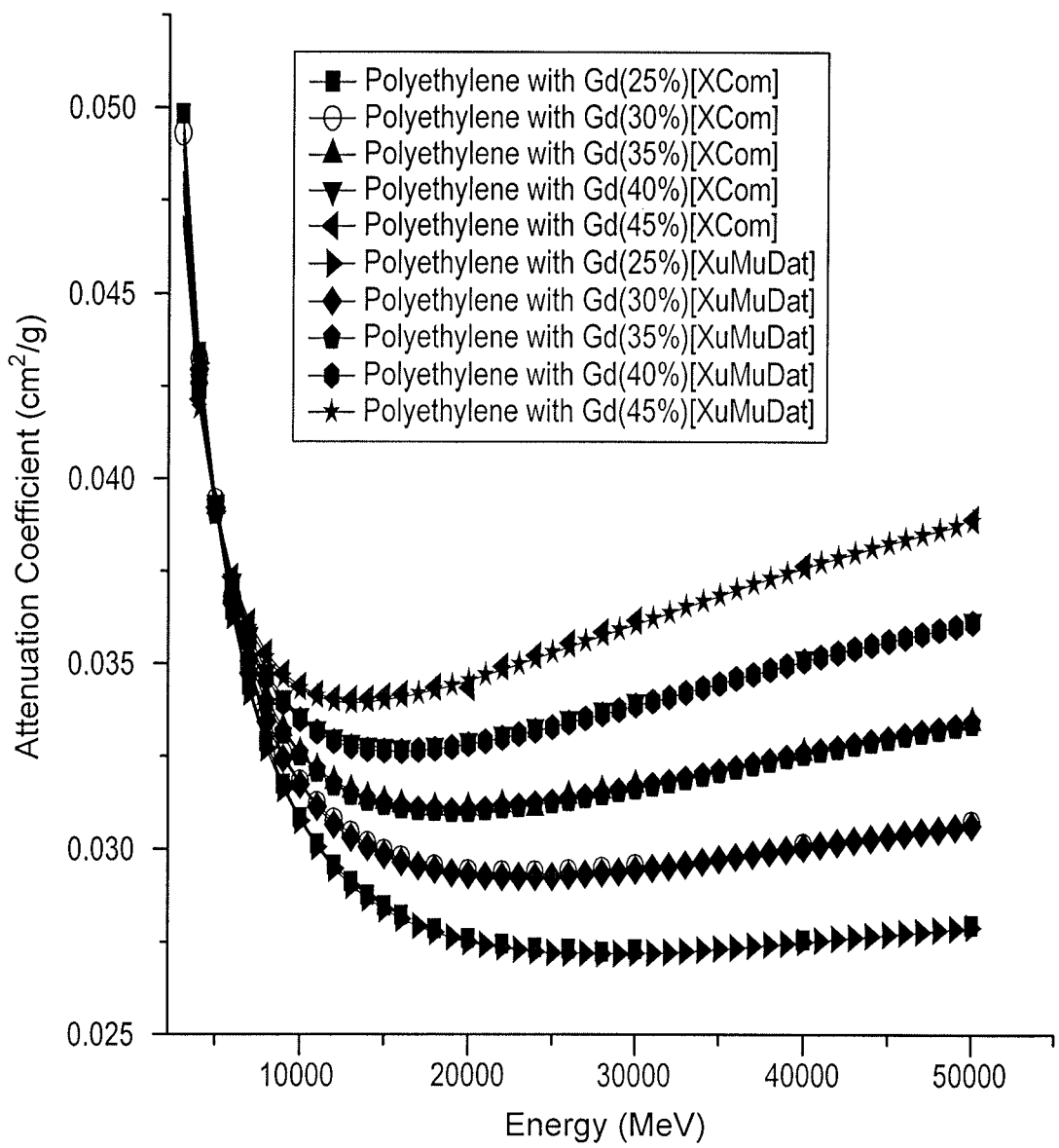
FIG. 8B is a graph representing the attenuation coefficient for the compositions including polyethylene and various amounts of gadolinium, using both XCOM and XuMuDat analyses.
Figure 8C:
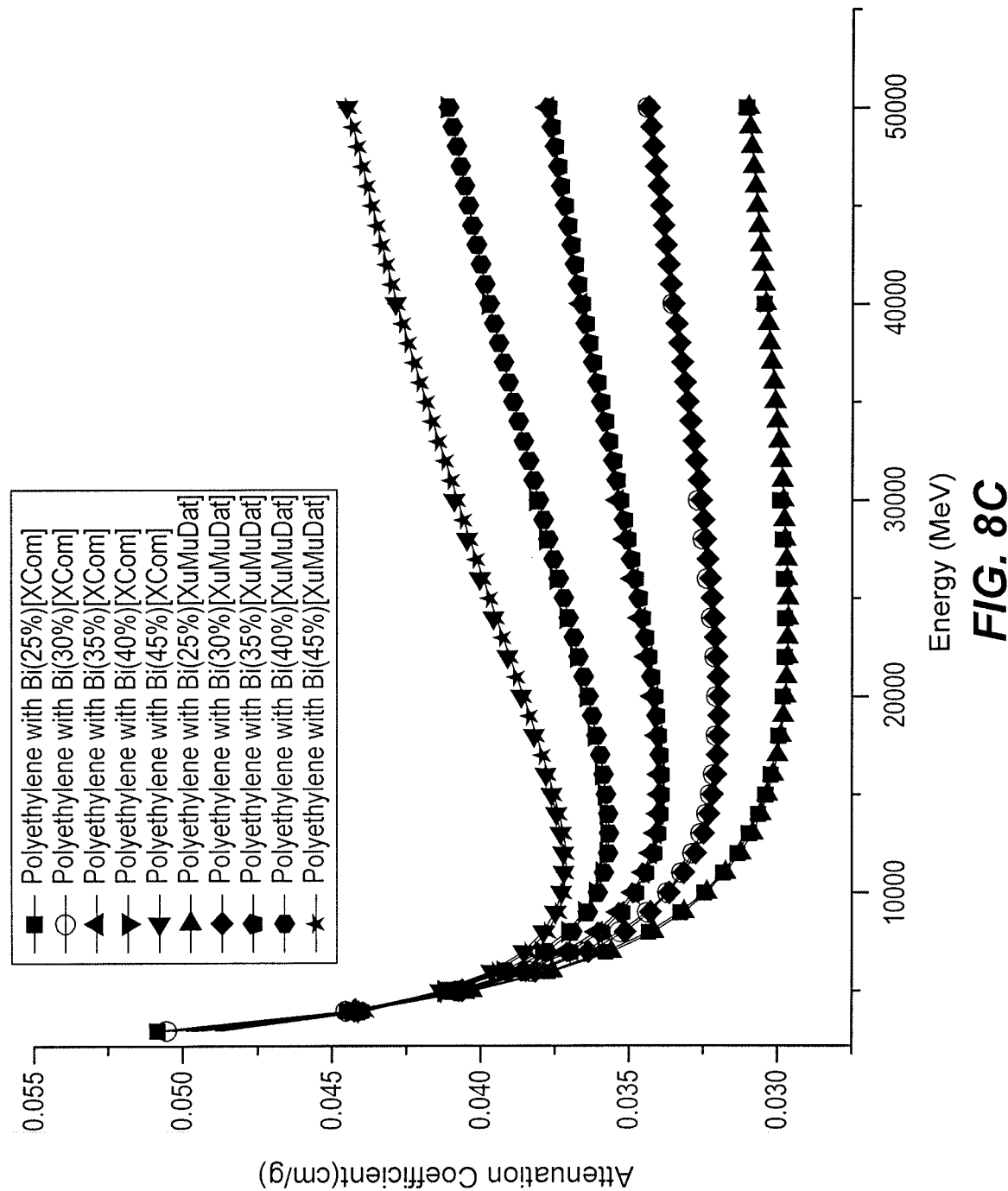
FIG. 8C is a graph representing the attenuation coefficient for the compositions including polyethylene and various amounts of bismuth, using both XCOM and XuMuDat analyses.

The results for both XCOM and XuMuDat testing are shown in FIG. 7, and reflected in the graphs in FIGS. 8A, 8B, and 8C. FIG. 7 is a chart listing the attenuation coefficients for compositions including polyethylene and one metal in various proportions, for each of the tested energy levels: 3000, 5000, 10,000, 15,000, 20,000, 25,000, 30,000, 40,000, and 50,000 MeV. FIGS. 8A to 8C are graphs plotting the attenuation coefficient for the range of energy from 3000 MeV to 50,000 MeV, for the compositions including polyethylene and the various proportions of lead (FIG. 8A), gadolinium (FIG. 8B), and bismuth (FIG. 8C).

As illustrated in FIGS. 8A to 8C, compositions including polyethylene and lead demonstrated the highest attenuation coefficients. The composition including gadolinium and the composition including bismuth also produced good results, while providing certain weight and toxicity advantages compared to lead. These results were again confirmed by the very similar results produced by both simulations with XCOM and XuMuDat software.

Example 6: Kevlar® Aramid Fiber Mixed with Lead, Gadolinium and Bismuth

Kevlar® aramid fiber (polyparaphenylene terephthalamide) is a plastic with a very high tensile strength and a very resilient nature, especially at low temperatures. At higher temperatures, the tensile strength reduces about 10% to 20%. Kevlar® aramid fiber is used for different applications to minimize destructive consequences of war or other hostile activity.

Consistent with the procedures above, Kevlar® was mixed with different percentages of lead, gadolinium, and bismuth for computationally calculating the attenuation coefficients of the various compositins. The various mixtures including Kevlar® aramid fiber are depicted in FIG. 9.

Figure 11A:
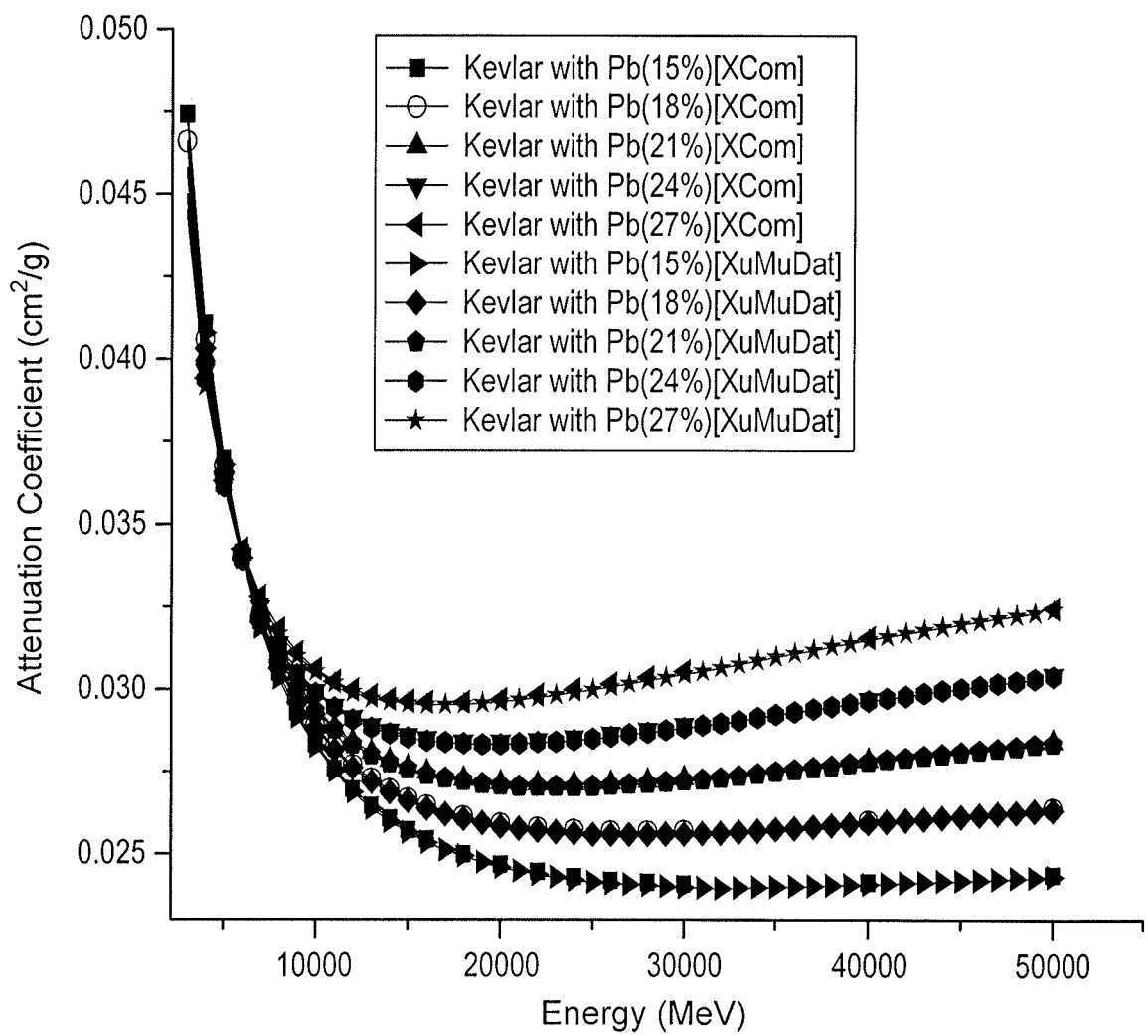
FIG. 11A is a graph representing the attenuation coefficient for Kevlar® aramid fiber with various amounts of lead, using both XCOM and XuMuDat analyses.
Figure 11B:
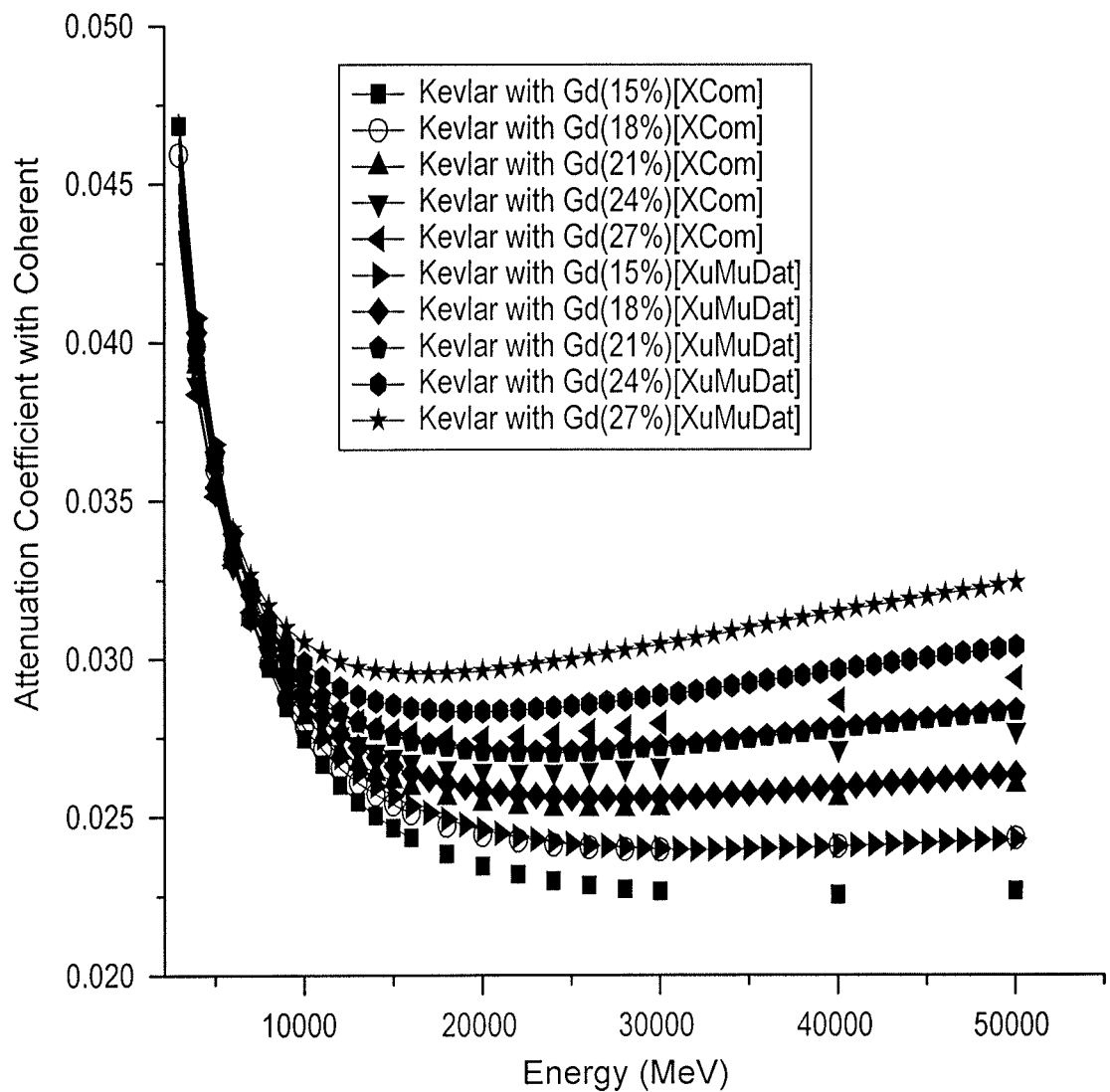
FIG. 11B is a graph representing the attenuation coefficient for the compositions including Kevlar® aramid fiber and various amounts of gadolinium, using both XCOM and XuMuDat analyses.
Figure 11C:
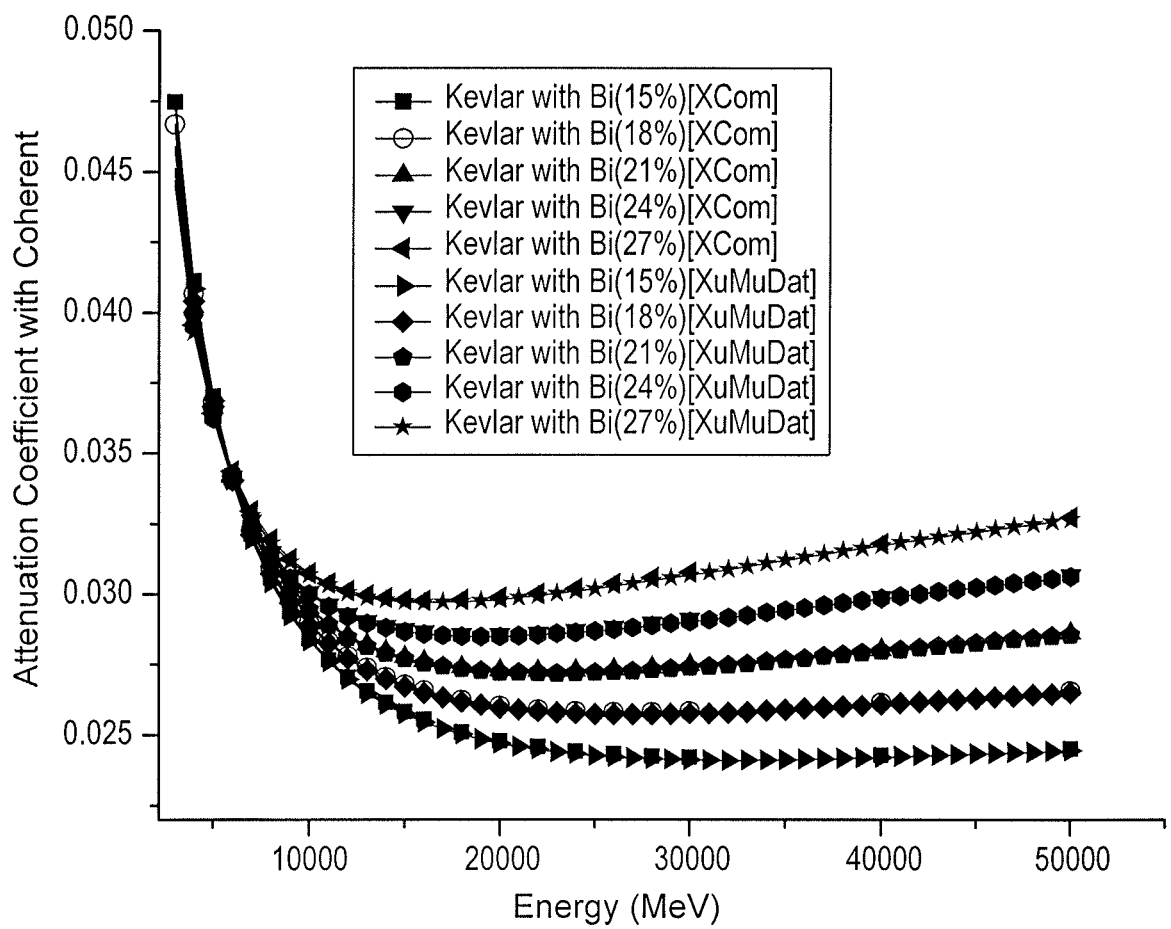
FIG. 11C is a graph representing the attenuation coefficient for the compositions including Kevlar® aramid fiber and various amounts of bismuth, using both XCOM and XuMuDat analyses.

Both XCOM and XuMuDat programs were used to calculate the attenuation coefficients of the compositions. The simulated attenuation coefficients are set out in FIG. 10. FIGS. 11A, 11B, and 11C plot the attenuation coefficient against the energy level for the various lead, gadolinium, and bismuth mixtures, respectively. Comparatively, the lead mixtures again produced the highest attenuation coefficients, while the gadolinium and bismuth mixtures still produced very good attenuation coefficients while offering other advantages, e.g., lower weight and less toxicity than lead compositions.

It is to be understood that the method for development of radiation shielding compositions for radiation shielding applications are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for development of radiation shielding compositions, comprising the steps of:
performing computational analysis on a computer to calculate a gamma radiation attenuation coefficient for at least nine distinct compositions, each of the compositions having a polymer matrix and functionalized particles of a single metal homogeneously dispersed in the polymer matrix in concentrations of 2%, 4%, 6%, 8%, and 10% w/w, respectively, in order to determine a concentration of the metal in the polymer matrix resulting in a maximum attenuation coefficient, thereby identifying the best candidate composition for radiation shielding, wherein the polymer matrix comprises a each of polyacrylonitrile, polyethylene, and polyparaphenylene terephthalamide and the metal particles comprising particles of each of lead, gadolinium, and bismuth;
preparing a radiation shielding material comprising the composition identified as the best candidate for radiation shielding by computational chemistry;
repeating the steps of performing computational analysis and preparing a radiation shielding material, wherein the repetitive steps are performed and calculated for a plurality of energy levels, the energy levels range from 3,000 MeV to 50,000 MeV; and
displaying the calculated attenuation coefficients for each of the compositions at each of the concentrations and at each of the energy levels.

* * * * *